United States Patent Office 2,712,363
Patented July 5, 1955

2,712,363

MINIMIZING LOSS OF TRANSPARENCY OF SIGHT FEED LUBRICATOR FLUIDS

Samuel Clyde Vaughn, Berkeley, and George C. Donovan, Martinez, Calif., assignors to Tide Water Associated Oil Company, San Francisco, Calif., a corporation of Delaware No Drawing. Application May 29, 1951,
Serial No. 228,965

5 Claims. (Cl. 184—1)

The present invention relates to a fluid for lubricator sight glasses. More particularly, it relates to a sight glass fluid for use in connection with oils containing dissolved soaps.

Force feed lubricating devices are now widely used in conjunction with machinery and equipment wherein the delivery of oil may be in minute quantities accurately regulated to insure that an oil film of desired density is distributed as required. A specific example is found in the McCord lubricator. This comprises an adjustable pump and a sight glass arrangement through which oil is forced under pressure to the parts of the machinery to be lubricated. The sight glass arrangement comprises a metal tube having a glass window on both obverse and reverse sides and having a wire vertically and centrally suspended therein. The oil travels along this wire under pressure in an upward direction through an oil-immiscible liquid filling the sight glass. This arrangement provides a convenient visual indication of oil flow, thereby permitting proper adjustments to be made.

Polyhydric alcohols, such as glycols and glycerols, have generally been found useful as sight glass fluids. These materials perform well when used in conjunction with plain petroleum lubricating oils. However, oils containing various types of additives have now come into common use. Particularly, when oils containing metal soaps are used, it is found that the glycol or glycerol in the sight glass becomes darkened and even opaque within a few hours. It is believed that this darkening is caused by the glycol or glycerine dissolving the soap out of the oil.

Certain requirements are generally recognized for satisfactory sight glass fluids. The fluids should be transparent and remain so during prolonged operation. They should also be mobile, non-corrosive to ferrous metals and copper, of relatively high specific gravity, and immiscible with the lubricating oil.

It is an object of the present invention to provide a sight glass fluid for lubricators which meets the requisites for conventional materials of this kind and in addition avoids the darkening normally encountered with oils containing soap additives.

It is a further object of the present invention to provide a means for observing the flow of oil containing soap additive through a lubricator sight glass fluid wherein vision remains unobstructed throughout extended periods of time.

Other objects of the present invention will be apparent from the more detailed description below.

In accordance with the invention it has been found that a solution of alkaline earth metal halide when used as the sight glass fluid remains perfectly clear for extended continuous operation. The invention further contemplates the addition to the alkaline earth halide solution of other materials to inhibit any corrosive action the salt may have on metal parts. These additional materials may comprise a known corrosion inhibitor with or without an alkaline agent to control the pH within desired limits.

The invention may be more readily understood from the following examples illustrating specific applications of the same.

EXAMPLE I

An aqueous solution was prepared containing 14% by weight of barium chloride and 1% by weight of sodium nitrite. The pH of this solution was then adjusted to pH 9 by the addition of $NH_4OH$. The resulting fluid was then introduced into the sight glass of a McCord type lubricator operating on a compounded lubricating oil. The lubricating oil contained 16% by volume of a commercial detergent type additive marketed under the trade name "Paranox 64," which is an oil solution containing about 30% by volume of barium and calcium soaps, the soaps being primarily phenates more or less containing combined sulfur, and sulfonates. The Paranox 64 had the following analysis:

| | Weight percent |
|---|---|
| Phosphorus | 0.006 |
| Sulfur | 2.9 |
| Barium | 5.7 |
| Calcium | 0.55 |

After more than 70 hours of continued operation, the sight glass fluid remained water-white, and no corrosion of the lubricator could be detected.

EXAMPLE II

An aqueous solution was prepared containing 10% by weight of calcium chloride and 1% by weight of sodium nitrite. The pH of this solution was then adjusted to pH 9 by the addition of $NH_4OH$. The resulting fluid was then introduced into the sight glass of a McCord type lubricator operating on a compounded lubricating oil. The lubricating oil used in this example contained the same detergent as in Example I, and in the same amount. No clouding of the sight glass fluid and no corrosion of the lubricator resulted after 70 hours of continued operation.

EXAMPLE III

An aqueous solution was prepared as in Example I and was similarly used in a lubricator sight glass as in Example I except that the oil used contained 20% by volume of a commercial detergent type additive marketed under the trade name of "Oronite 670" which is an oil solution containing about 60% of calcium soaps, the soaps being primarily phenates more or less containing combined sulfur, and sulfonates. The Oronite 670 had the following analysis:

| | Weight percent |
|---|---|
| Phosphorus | 0.2 |
| Sulphur | 2.3 |
| Calcium | 1.88 |
| Zinc | 0.2 |
| Magnesium | 0.1 |
| Sodium | Trace |
| Chlorine | 0.16 |

After 70 hours of continued operation, there was no darkening or emulsification of the sight glass fluid and no corrosion was found.

From the above examples, it will be appreciated that any chloride of the alkaline earth metals can be used to make a satisfactory sight glass fluid. Also, it has been found that the concentration of the alkaline earth metal chlorides as well as that of the sodium nitrite in the sight glass fluid can be varied within limits. The 14% concentration of barium chloride represents a half saturated aqueous solution at 20° C. This concentration may be selected as one having a high barium ion concentration along with a reasonable stability against super-saturation due to low temperatures and/or mechanical loss of water. However, a concentration range of 5%–24% of barium chloride is satisfactory. The other alkaline earth chlorides, because of their higher solubilities, may be used in greater concentration if desired. The concentration range of 0.1%–2.0% sodium nitrite is acceptable and convenient. The upper limit of 2.0% is one directed by economy rather than utility. Finally, it has been found that the pH can be adjusted within the range of 8.5–11.0 with either NH$_4$OH or other alkaline agents, such as sodium or potassium hydroxide. In commercial practice, it may be preferable to adjust the pH with a carbonate free sodium hydroxide solution. This may be conveniently prepared by making a saturated solution of relatively pure sodium hydroxide, and then filtering or decanting the solution from the sodium carbonate which may form as a precipitate. The advantages of using sodium hydroxide are that it is non-volatile, relatively inexpensive, and does not form complexes with copper or copper alloys. Other alkaline reagents are also recommended.

Corrosion inhibitors other than sodium nitrite will suggest themselves to those skilled in the art. The principal requisite is that they be compatible with an alkaline solution of alkaline earth metal chlorides. Inhibitors used in commercial permanent type antifreeze compounds may be suitable.

Halides other than chlorides, particularly the bromides and iodides, may be used, depending on the solubility characteristics of the particular halide selected.

The results of ten tests of various sight glass fluids are tabulated in the accompanying table for illustration and comparison.

From an examination of the table, it will be evident that the present invention provides a new and useful means of viewing the flow of oil through a sight glass when detergent type oils are used, during prolonged periods of continued operation.

The sight glass fluid described herein is particularly recommended for use in conventional type lubricators, for example those of the McCord design. However, other uses and applications may be apparent to those persons engaged in this and related or analogous arts.

In the foregoing and in the appended claims the term "soap" is used in the broad sense, commonly employed in the lubricating oil art, to denote oil-soluble detergent organic compounds wherein an acid hydrogen atom is replaced by a metal.

Table

| Test # | Sight Glass Fluid | Weight Percent | Oil Composition | Vol. Percent | Results of Test & Condition of Fluid |
|---|---|---|---|---|---|
| 1 | Glycerol | 100 | Blending Stock / Paranox 64 | 84 / 16 | Turbid, Opaque, after 30 hrs. |
| 2 | Ethylene Glycol | 100 | Blending Stock / Paranox 64 | 84 / 16 | Do. |
| 3 | Sodium Sulfate / Distilled Water | 10 / 90 | Blending Stock / Paranox 64 | 84 / 16 | Do. |
| 4 | Magnesium Sulfate / Distilled Water | 10 / 90 | Blending Stock / Paranox 64 | 84 / 16 | Do. |
| 5 | Glycerol | 100 | Blending Stock / Oronite 670 | 80 / 20 | Turbid, Opaque, after 50 hrs. Gum formation in lubricator. |
| 6 | Barium Chloride / Distilled Water | 14 / 86 | Blending Stock / Paranox 64 | 84 / 16 | Clear, with no gum or emulsification, after 48 hrs. Some corrosion. |
| 7 | Barium Chloride / Sodium Nitrite / Distilled Water | 14 / 1 / 85 | Blending Stock / Paranox 64 | 84 / 16 | Clear, with no gum or emulsification, after 48 hrs. Very slight corrosion. |
| 8 | Barium Chloride / Sodium Nitrite / Distilled Water / Ammonium Hydroxide | 14 / 1 / 85 / (*) | Blending Stock / Paranox 64 | 84 / 16 | Clear, with no gum, emulsification, or corrosion, after 70 hrs. |
| 9 | Calcium Chloride / Sodium Nitrite / Distilled Water / Ammonium Hydroxide | 10 / 1 / 89 / (*) | Blending Stock / Paranox 64 | 84 / 16 | Do. |
| 10 | Barium Chloride / Sodium Nitrite / Distilled Water / Ammonium Hydroxide | 14 / 1 / 85 / (*) | Blending Stock / Oronite 670 | 80 / 20 | Do. |

*Sufficient ammonium hydroxide was added to adjust the pH of the fluid to pH 9.
The rate of oil flow through the lubricator was 33 ml./hr. in tests 1–4, and 40 ml./hr. in tests 5–10.

We claim:
1. The process of minimizing loss of transparency in the fluid of a sight feed lubricating system when pressure feeding lubricating oils containing dissolved detergent metal soaps, which comprises feeding a lubricating oil carrying a detergent additive of metal soap through an aqueous solution of an alkaline earth metal halide, said solution containing at least 5% by weight of the halide.

2. The process of claim 1 in which the solution is inhibited against corrosive action and has a pH of between 8½ and 11.

3. The process of claim 1 in which the halide is a chloride present from 5% by weight to an amount short of precipitating the salt when the solution is chilled or evaporated in use, and the solution is inhibited against corrosive action on metal.

4. The process of claim 1 in which the halide is barium chloride from 5% to 24% by weight, a corrosion inhibitor is present in amount between 0.1% and 2%, and an alkaline agent is present in amount to bring the pH of the solution between 8½ and 11.

5. The process of claim 4 in which the corrosion inhibitor is sodium nitrite and the alkaline agent is ammonium hydroxide.

References Cited in the file of this patent

UNITED STATES PATENTS

| | | |
|---|---|---|
| 2,002,523 | Buc | May 28, 1935 |
| 2,183,178 | Williams et al. | Dec. 12, 1939 |
| 2,297,666 | Wachter | Sept. 29, 1942 |
| 2,303,397 | Schwartz | Dec. 1, 1942 |
| 2,351,465 | Wachter | June 13, 1944 |
| 2,483,363 | Villiers | Sept. 27, 1949 |
| 2,689,627 | Woog | Sept. 21, 1954 |